UNITED STATES PATENT OFFICE.

ALVA C. DINKEY, OF PITTSBURGH, PENNSYLVANIA.

PROCESS OF MAKING STEEL.

1,162,755.

Specification of Letters Patent. Patented Dec. 7, 1915.

No Drawing. Application filed August 7, 1914. Serial No. 855,575.

*To all whom it may concern:*

Be it known that I, ALVA C. DINKEY, a citizen of the United States, residing at Pittsburgh, in the county of Allegheny and State of Pennsylvania, have invented certain new and useful Improvements in Processes of Making Steel, of which the following is a specification.

My invention relates to the manufacture of steel and while not restricted to such uses more particularly relates to the manufacture of steel such as acid Bessemer steel in which the phosphorus must be below a specified limit.

The available supply of low phosphorus or Bessemer ores is decreasing with a corresponding increase in the cost thereof, which is one reason for the decrease in the production of acid Bessemer steel. Making steel by the open hearth process requires much more time and is more expensive than by the acid Bessemer process.

In one known process of making steel, it has been the practice to first blow the molten pig iron in an acid Bessemer converter, in order to remove the silicon as far as possible, carbon also being removed to the desired extent in this operation. The partially refined metal is then transferred to an open hearth furnace, pig iron or steel or iron scrap being added when necessary or desirable and the charge or heat of metal is treated in the usual manner to reduce or substantially eliminate the phosphorus and produce steel of the desired composition.

The primary object of my invention is to provide a process of making low phosphorus steel from iron containing phosphorus above the permissible or specified limit, by which the cost of manufacture is reduced, difficulties heretofore experienced in making the steel are avoided, and steel of substantially uniform composition or equality is quickly and cheaply obtained.

Another object of my invention is to provide a novel method of making steel whereby low phosphorus steel is easily and cheaply made from high phosphorus iron and the silicon necessary to complete the refining operation is provided in a cheap and economical manner.

Still further objects of my invention will become apparent as the invention is more fully described hereinafter and is specifically pointed out in the appended claims.

My invention consists in partially refining iron in a furnace, basic materials being used and the iron being maintained at a relatively low temperature in this step of the operation, to effect the removal of phosphorus without, necessarily, a material reduction in carbon, mixing known quantities of the partly refined metal and of high phosphorus and preferably high silicon metal and treating the so formed heat of mixed metals in an acid Bessemer converter to complete the refining operation and obtain a steel of the required phosphorus content.

The invention still further consists in preparing and storing quantities of low phosphorus metal in readiness for use by mixing with suitable proportions of high phosphorus iron, in making heats of metal of known quantity and composition for further treatment in the acid Bessemer converter.

The invention still further consists in providing a process whereby successive heats of Bessemer steel of varying phosphorus content may be made from pig iron containing above a permissible limit of phosphorus, in an acid Bessemer converter.

In the practice of my invention I charge into the furnace a quantity of limestone and ore or other oxid of iron, the limestone amounting to about five per cent. and the ore or oxid to about 15 to 20 per cent. by weight of the metal charged. The amounts of limestone and ore may be varied considerably according to the composition of the iron used and the degree of refining desired. For example, the limestone may be omitted entirely, and basic additions other than ore may be used. These materials are heated until they are at, say, a red heat, or are pasty and even fused, depending upon their nature. The charge of pig iron, in a molten condition, is then poured into the furnace, preferably as rapidly and at as nearly one time as possible. This causes an active reaction and a rapid production of basic slag, and the materials being at a comparatively low temperature, the iron oxid oxidizes the phosphorus, silicon and manganese in the pig iron with extreme rapidity and at the same time oxidizes a slight portion of the carbon. At the end of a time interval, of say about one hour more or less, depending upon the method of operation and the size of the charge, the phosphorus will have been substantially eliminated, that is to say, reduced to about 10 per cent. of its original content. The slag formed by the reactions above stated and containing the eliminated phosphorus and silicon is preferably removed from the furnace as it forms and boils up. When found convenient, however, the slag may be removed at a single operation either during or at the completion of the refining process. It is to be understood that it need not necessarily be removed until the end of the process. The furnace is then tapped and the partly refined metal removed therefrom is transferred to a mixer or storage vessel. The iron will be treated in the preliminary furnace preferably in about 50 to 100 ton lots and as the storage vessel will have a much greater capacity, (say 500 or more tons), a large quantity of partly refined or semi-finished metal can be stored therein.

In some cases the partly refined metal, when placed in the storage vessel will be mixed therein with untreated high phosphorus pig iron, so that the measured quantities withdrawn from time to time to make up a heat for the converter will have an average phosphorus content below the required limit. In other cases the partly refined metal will be stored in one storage vessel and untreated high phosphorus metal will be stored in another separate vessel. In such case, the composition of the high phosphorus metal in one vessel and of the partly refined metal in another storage vessel being known, in taking known quantities or suitable proportions of metal from each vessel in forming a heat for the converter, heats of known weight and having a low phosphorus content will be obtained, so that successive heats of steel of varying composition, heretofore difficult or impossible to make in a Bessemer converter, will be readily obtained. A charge of mixed metal, when one storage vessel is employed, or a heat of the required size made up of varying proportions of metal from each of a plurality of storage vessels, is then placed in the Bessemer converter and is blown in the usual manner to complete the removal of the silicon and carbon, ferro-silicon being added when necessary or desirable to the heat in the converter. The blown steel is deoxidized and is recarbonized in the usual manner and is then poured into ingot molds in accordance with the usual practice.

The advantages of my invention will be apparent to the skilled steel maker. It enables steel below a specified limit as to phosphorus being made in a rapid and cheap manner from iron containing an excess of phosphorus. By using heats of known quantities and known compositions, mixtures of metal having varying percentages of phosphorus are readily obtained to suit the particular requirements desired and the mixed iron is made into steel by the acid Bessemer process, which, as is well known, is still the cheapest known process of making steel.

Modifications in the steps of the process may be made without departing from my invention. The storage vessels may be dispensed with, or may be employed in partly refining the metal. The metals may be mixed in any known manner. An acid open hearth furnace may be employed in place of the acid Bessemer converter, and other variations may be made without departing from my invention as defined in the appended claims.

I claim:—

1. The process of making steel which consists in dephosphorizing pig iron, storing the partly refined metal, mixing the partly refined iron with untreated high silicon pig iron and then bessemerizing heats of the mixed metals in an acid converter; substantially as described.

2. The process of making steel which consists in dephosphorizing pig iron, making additions of silicon and then bessemerizing heats of the partly refined iron in an acid converter; substantially as described.

3. The process of making steel which consists in treating high phosphorus pig iron to remove phosphorus therefrom, mixing known quantities of the dephosphorized iron and of high phosphorus pig iron to form a heat and then bessemerizing the mixed metal in an acid converter.

4. The process of making steel which consists in dephosphorizing pig iron in a basic furnace, making additions of silicon and then treating heats of the partly refined iron in an acid furnace or converter.

In testimony whereof, I have hereunto set my hand.

ALVA C. DINKEY.

Witnesses:
JAMES W. HAMILTON,
R. D. LITTLE.

Copies of this patent may be obtained for five cents each, by addressing the "Commissioner of Patents, Washington, D. C."